United States Patent [19]

Kesarwani

[11] 4,339,732
[45] Jul. 13, 1982

[54] CLOSED LOOP CONSTANT CURRENT TUNED OSCILLATOR

[75] Inventor: Hari M. Kesarwani, Cypress, Calif.
[73] Assignee: Xerox Corporation, Stamford, Conn.
[21] Appl. No.: 172,093
[22] Filed: Jul. 25, 1980
[51] Int. Cl.³ .................. H02M 1/08; H02M 3/335; H03L 5/00
[52] U.S. Cl. .................. 331/109; 331/113 A; 331/183; 363/23
[58] Field of Search .................. 331/109, 113 A, 183, 331/117 R; 363/23, 95–97

[56] References Cited

U.S. PATENT DOCUMENTS

| | | | |
|---|---|---|---|
| 2,950,446 | 8/1960 | Humez et al. | 331/183 X |
| 2,997,664 | 8/1961 | Jensen | 331/109 |
| 3,329,908 | 7/1967 | Harms | 331/109 |
| 3,775,702 | 11/1973 | Wallace | 331/109 |

*Primary Examiner*—Siegfried H. Grimm
*Attorney, Agent, or Firm*—Leonard Zalman

[57] ABSTRACT

A transformer coupled, resonant feedback, tuned oscillator circuit in which the output current to a low power variable load is maintained constant by incorporating into the circuit an additional feedback circuit which provides a DC error voltage to the oscillator circuit enabling it to compensate for variations in core loss resistance, variations in load, and variations in other circuit parameters. The feedback circuit includes two separate electronic switches both of which are connected to a voltage averaging circuit and an error amplifier which compares the voltage of the averaging circuit against an adjustable reference voltage whereby the DC error voltage is generated and supplied to the center tap of the transformer feedback winding. Because oscillator transformer core resistance variations can be compensated for, the design of the oscillator transformer can be simplified and readily available, not specially designed, transformers can be utilized.

4 Claims, 6 Drawing Figures

4,339,732

CLOSED LOOP CONSTANT CURRENT TUNED OSCILLATOR

BACKGROUND OF THE INVENTION

Voltage feedback tuned oscillators are well known and often used because of their several advantages. They are simple and reliable, often consisting of only a transformer, a capacitor and a pair of transistors providing current paths for each half cycle of AC output. They bypass all other frequencies but the fundamental frequency of oscillation, and, therefore, they provide good input noise suppression, good input power factor and inherent output short circuit protection.

Tuned oscillators operate on the principle that the active device permit power gain at the frequency of oscillation. Thus, the active device must have sufficient gain to overcome circuit losses and establish exactly unity gain around the feedback loop. In addition, the phase shifts introduced by the active device and the feedback network must result in exactly zero phase shift around the overall circuit.

U.S. Pat. No. 3,775,702 discloses a transformer coupled, resonant feedback, tuned oscillator power supply with provision for sensing the variation in the voltage across the secondary winding of the transformer by means of a center-tapped feedback winding which responsively adjusts the value of the feedback voltage $e_f$ to the base elements of the amplifier transistors to thereby adjust the primary current, whereby the output current which flows through the load is maintained at a constant value. That oscillator requires that the transformer core loss resistance (Rc) remain substantially constant over the operating range of the power supply in order to provide the constant current output. A transformer core with a constant core loss resistance (Rc) is not readily commercially available and requires special design which adds significantly to the cost of the disclosed power supply. Thus, there is a need for a transformer coupled, resonant feedback, tuned oscillator which can provide a constant current output at different loads with a commercially available inexpensive transformer core that does not require a constant core loss resistance (Rc). Also, if such an oscillator has a feedback control network that responds only to load current demand, tighter load current regulation can be accomplished.

SUMMARY OF THE INVENTION

In accordance with the invention, load current regulation of a transformer coupled, resonant feedback, tuned oscillator circuit is achieved by incorporating into such an oscillator circuit an additional feedback circuit which provides a DC error voltage to the oscillator circuit which enables it to compensate for variations in core loss resistance, load and other circuit parameters. The oscillator circuit of the invention is comprised of an arrangement of an oscillator section and a load current control network section. The oscillator section includes a voltage feedback transformer having a center-tapped primary winding, a center-tapped feedback winding and a secondary winding. Two transistors having their respective collectors connected to opposing ends of the primary winding are the amplifier elements of the oscillator. The output voltage across the secondary winding, as sensed by the feedback winding, is connected to the base elements of transistors in order to provide necessary feedback to cause sustained oscillation. A fixed capacitor C along with distributed capacity C1 connected across the transformer primary or secondary winding and the magnetizing inductance Lm of the transformer are the parameters of the frequency determining tank circuit of the osciallator.

The load current control network section consists of two separate electronic switches both of which are connected to a voltage averaging circuit and an error amplifier which compares the voltage of the averaging circuit against an adjustable reference voltage. Total return current of the transformer output is sensed by a resistor and processed by the electronic switches such that the voltage applied to the averaging network corresponds only to the ideally rectified load current component and the capacitive leakage current component which, being a symmetrical AC waveform, will have an average value of zero. The error voltage $E_c$ of the error amplifier produced by comparing the voltage across the averaging network against an external reference input voltage is applied to the center-tap of the feedback winding through a current limiting resistor. The reference input voltage sets the error voltage $E_c$ which controls the load current.

According to the invention, the transformer primary current consists of a waveform having a sinusoidal component and a squarewave component. The amplitude of the first component is determined by the feedback winding and is proportional to the output voltage that appears across the secondary winding. This provides for the magnetizing current of the transformer and only a part of it is coupled to the load current. Proper selection in the amplitude of this waveform ensures a sustained oscillation. The second squarewave component provides for the load current. Any variation in the load current in the secondary winding of the transformer is sensed by a control network which responsively adjusts the error voltage $E_c$ applied to the base elements of the amplifier transistors via the feedback winding to thereby adjust the primary current of the transformer, whereby the output current which flows over the load is maintained at a constant value.

DETAILED DESCRIPTION OF THE INVENTION

Figure 1:
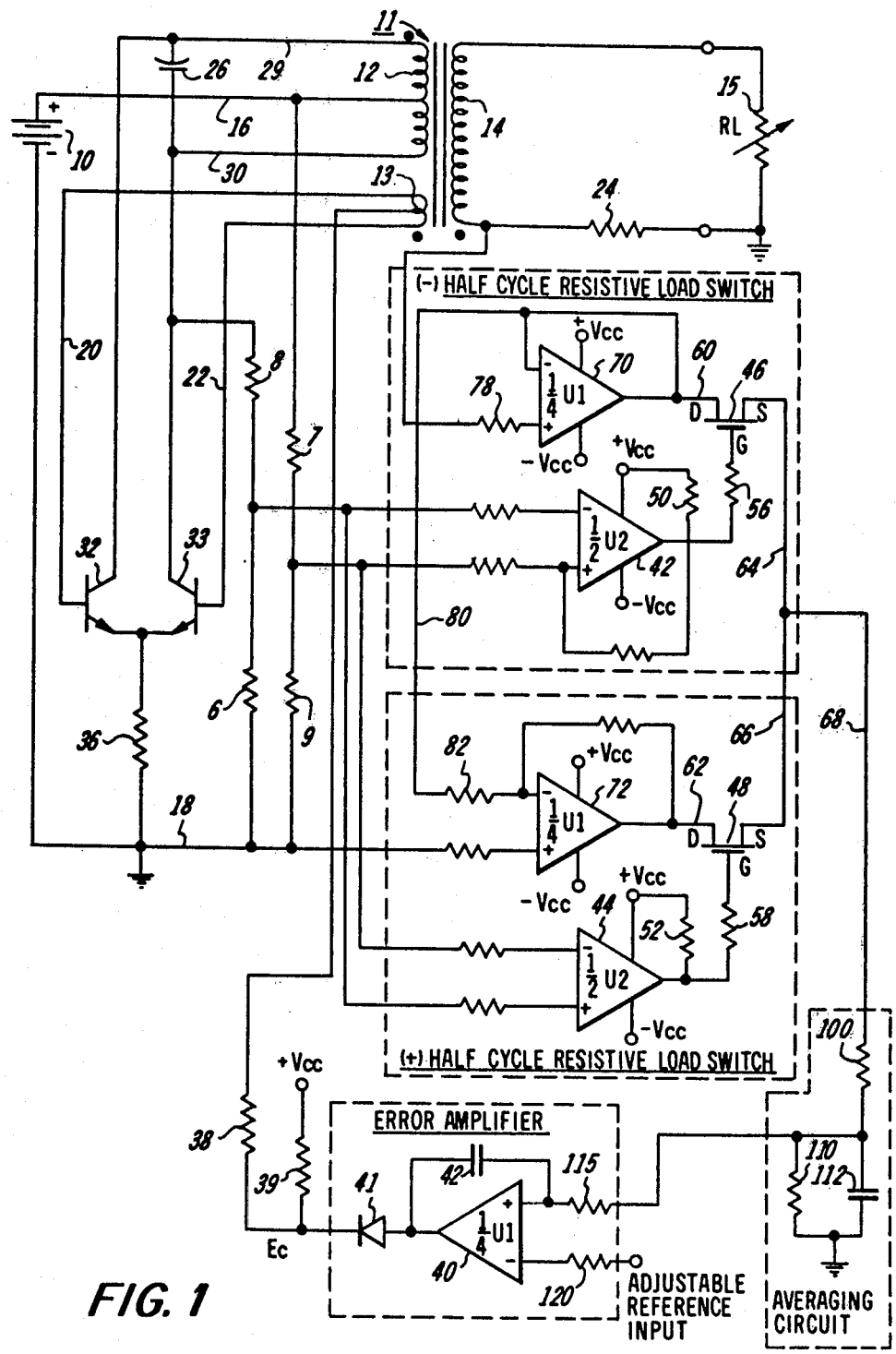
FIG. 1 is a combined schematic circuit diagram of the circuit of the invention.

As shown in FIG. 1, the oscillator of the invention includes a high voltage transformer 11 having a center tapped primary winding 12, a center-tapped feedback winding 13, and a secondary or output winding 14. Output winding 14 of the oscillator transformer is connected to supply a constant current to a variable resistive load 15. The terminal ends of the primary winding 12 are connected over the conductors 29 and 30 to the collector elements of amplifier transistors 32 and 34, respectively. Across the primary winding over the conductors 29 and 30 is also connected the frequency determing capacitor 26. The terminal ends of the feedback winding 13 are connected over the conductors 20 and 22 to the base elements of the transistors 32 and 34, respectively. The emitters of the transistors 32, 34 are in turn connected over a common resistor 36 to the negative or ground terminal of a power supply 10 which has its positive terminal connected to the center tap of primary winding 12.

The center-tap of the feedback winding 13 is connected over the current limiting resistors 38 and 39 to a positive DC power source (+) Vcc. That connection provides more than unity gain around the feedback loop of the transformer to start the oscillation. The phase relationship between the primary winding 12 and feedback winding 13 is indicated in FIG. 1 by dots adjacent the transformer windings. Feedback winding 13 provides positive voltage feedback over conductors 20 and 22 to the base elements of the transistors 32, 34, respectively, to maintain sustained oscillation.

Figure 2:
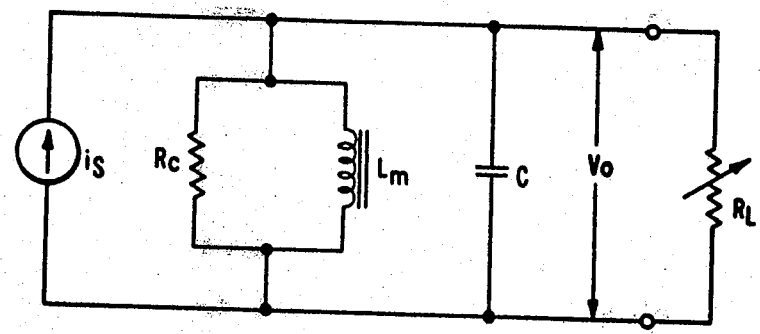
FIG. 2 is the schematic diagram of the equivalent circuit of the oscillator transformer of the circuit embodiment of FIG. 1.

The windings of the transformer 11 are closely coupled so that for operation within low range of audio frequency and low power output the leakage inductors and winding resistances can be neglected without loss of accuracy of analysis. FIG. 2 is an equivalent circuit of the transformer of FIG. 1 with these considerations where all parameters are referred to the secondary side. Magnetizing inductance Lm in parallel with capacitor C are parameters of the tank circuit of the oscillator which will have maximum response at resonance. The frequency of oscillation is, therefore:

$$\omega^2 = (1)/(CLm) \qquad (1)$$

where C includes the leakage capacity of the load, the distributed capacity of the transformer and the capacitor element 26. Since transformer 11 is a gapped one, its magnetizing inductance can be changed by changing the gap. Therefore, a desired operating frequency can be obtained by changing the value of the capacitor 26 and/or magnetizing inductance Lm.

The error voltage output $E_c$ of an amplifier 40 is connected through a diode 41 to the junction point of resistors 38,39. This circuit arrangement provides static current flow superimposed on the AC current in the feedback winding connected to the base elements of the amplifier transistors 32, 34. Once the circuit is oscillating, feedback voltage provided by winding 13 causes transistors 32 and 34 to conduct current on alternate half cycles. Current flow during the one half cycle will be from the DC voltage source 10 over conductor 16 to the center-tap of primary winding 12 and over half of the primary winding to the collector of the "on" transistor. Assuming during one half cycle that transistor 32 is "on", current will flow through conductor 29, from the collector to the emitter of the transistor 32, and through resistor 36 to the negative terminal of the DC power supply source. When transistor 34 starts to conduct, the voltage developed across the primary winding 12 induces voltage in the feedback winding 13 which drives transistor 34 rapidly towards saturation turning transistor 32 off. Current during this period flows through conductor 30, from collector to emitter of transistor 34, and through resistor 36 to the negative terminal of DC source 10. On completion of this transition, constant voltage $Vp = ES - V_{CE(SAT)} - ipRE$ is applied across primary winding 12. Since:

$$(d\phi/dt) = (Vp/Np) \qquad (2)$$

flux $\phi$ must increase in the core at a constant rate, causing flux density $B = (\phi/A)$ to increase similarily so long as the magnetization current $im = (H/Np)$ can be provided to maintain $d\phi/dt$ constant. When the reflected load current, plus the magnetization current exceed the collector current which transistor 34 can provide with available drive to its base element, transistor 34 comes out of saturation causing voltage Vp across the primary winding to decrease. Feedback voltage $e_f$ and primary current ip decrease regeneratively, turning transistor 34 off and terminating the half cycle.

Figure 3:
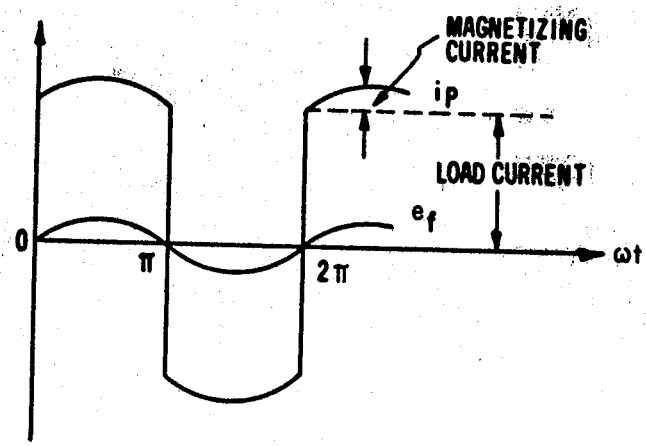
FIG. 3 is a graphic representation of the components of the primary current of the transformer of the embodiment of FIG. 1.

As the flux in the transformer core collapses due to transistor 34 turning off, voltage that biases transistor 32 into conduction and initiates the next half cycle is induced in the feedback winding 13. The operation is the same as the previous half cycle except that the supply voltage is applied to the other half of the primary winding, causing a reversal of polarity in the induced output voltage. Transistor 32 conducts until the base drive to it can no longer support its increasing collector current to maintain $d\phi/dt$ constant at which point the flux collapses completing the full cycle. Primary current ip during any one half cycle is expressed as:

$$ip = [(E_c - V_{BE})/(R_E + R_1/B)] + (e_f - V_{BE})/R_E \qquad (3)$$

where B is current gain of the "on" transistor, $e_f$ is the feedback voltage applied to the base of the "on" transistor, and $E_c$ is the control voltage output of the error amplifier 40. FIG. 3 is a graphical representation of the primary current in equation (3). The amplitude of the first component in equation (3), a squarewave form, is determined by $E_c$ and that of the second, a sinusoidal waveform, is determined by the feedback voltage $e_f$. According to the invention electronic control means are provided to vary $E_c$ responsive to load current variations thereby adjusting ip such that constant current over varying load is maintained.

Figure 4A:
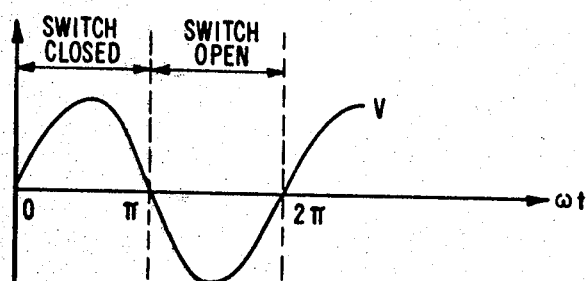
FIGS. 4A, 4B, and 4C are plots of various voltages generated during operation of the embodiment of FIG. 1 against a common time abscissa.

Referring again to FIG. 1, zero crossing points of the voltage across primary winding 11 are detected by voltage comparators 42 and 44 via resistor networks 6 8 and 7 9 for negative and positive half cycles, respectively. Comparators 42 and 44 are energized by a positive (+) Vcc DC voltage source and a negative (−) Vcc DC voltage source. Open collector outputs of the comparators 42 and 44 are connected to (+) Vcc through resistors 50 and 52 and through resistors 56 and 58 to gate elements of FET transistor switches 46 and 48, respectively. With reference to the time abscissa of the primary voltage shown in FIG. 4A, the output of comparator 44 is high for the positive half cycle causing FET switch 48 to be shorted and during the negative half cycle this output is low causing the FET switch 48 to open. The output of comparator 42 is high and low during respective negative and positive half cycle of the primary voltage causing FET switch 46 to be shorted and open, respectively, during those periods.

Figure 4B:
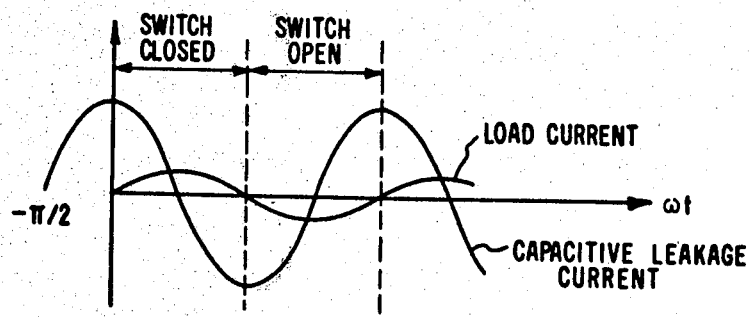
Figure 4C:
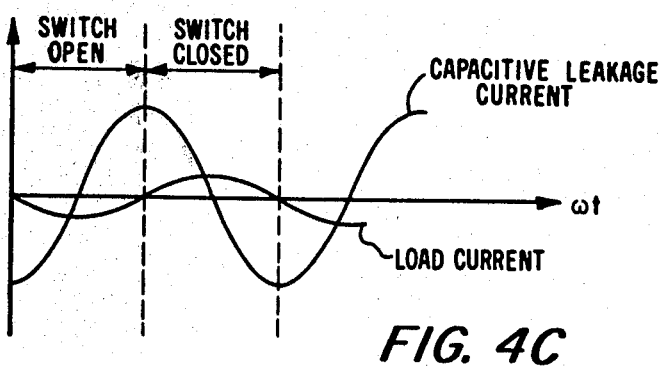

Return current in the secondary 14 of the transformer 11 flows through sense resistor 24. Sensed voltage across resistor 24 is supplied through resistor 78 to the non-inverting input of the voltage follower amplifier 70. From the phase relationship of the voltages shown by the dots in the transformer windings, voltage at the output of amplifier 70 is a direct phase inversion of the return current of the transformer. This voltage, connected over the conductor 60 to the drain element of the FET transistor 46, is comprised of two components. Referring to FIG. 4C, the load current component is in phase with the negative half cycle of the primary voltage inverted and the capacitive leakage current component leads it by 90°. Since FET 46 is closed only during the negative half cycle of primary voltage, the voltage at the source element will be the resultant waveform on the drain during the half cycle, but during the positive half cycle, FET 46 being open, voltage will not pass over from drain to source of FET 46.

The output voltage of amplifier 70 is also connected over the conductor 80 and through resistor 82 to the inverting input of unity gain amplifier 72. The output voltage at 72, connected over conductor 62 to the drain element of FET 48, is therefore a direct inversion of the voltage at amplifier 70 and a reproduction of the return current sense voltage of the transformer. Referring to FIG. 4B, the load current component of this waveform is in phase with the positive half cycle of the primary voltage and the capacitive leakage current component leads it by 90°. Since the FET transistor 48 is closed only during the positive half cycle of the primary voltage, its drain voltage is connected over the source element during this time, but during the negative half cycle, FET 48 being open, voltage will not pass over from drain to source.

Source elements of FETs 46 and 48 are connected over conductors 64, 66 and 68 to an averaging circuit which is comprised of resistors 100 and 110 and a capacitor 112. Due to the explained operation of the resistive load switches, the resultant waveform applied to the averaging circuit will, therefore, consist of an ideally rectified load current in phase with the primary voltage and a discontinuous but symmetrical capacity current that leads load current by 90°. During each half cycle of the load current, the leakage capacity current, being symmetrical, will have an average value of zero. Voltage across the averaging network is, therefore, a direct ratio of the load current.

Error amplifier 40 compares the voltage of the averaging circuit connected to its inverting input terminal over resistor 115 against an adjustable reference input voltage connected to its non-inverting input terminal over resistor 120. Compensation capacitor 42 connected across the output and inverting input terminals of amplifier 40 assures stable operation of the overall closed loop system. Output voltage Ec of the error amplifier 40 connects to the center-tap of the feedback winding 13 through blocking diode 41 and current limiting resistor 38.

With any error in the load current, followed by a change of voltage across the averaging circuit, the error amplifier responds by a change in its control voltage output Ec such that the primary current is maintained at a constant value. The output voltage of the transformer 11 is thus compensated for variations in the core loss resistance (Rc), leakage capacity current $I_{LK}$, and load variations $R_L$, to thereby maintain a constant load current.

The oscillator circuit of FIG. 1 can produce a constant load current without a specially designed transformer. For example, transformer 11 can be a C-core-Mangetics Metals MH-758 transformer. Other circuit components are also readily available on the commercial market, for example, transistors 32 and 34 can be 2N3879 NPN transistors of RCA Corporation, error amplifier 40 can be ¼ of quad amplifier LM324D of National Semiconductor Corporation, voltage comparators 42 and 44 can be a dual comparator LM339 of National Semiconductor Corporation, FET transistors 46 and 48 can be TIS-73 of TI. With those circuit components, source 10 would be 45 volts and sources Vcc would be 15 volts.

The oscillator circuit of the invention would be useful with all loads requiring a constant output current to a low power, variable load. One such useage is in a Xerographic process wherein a corona emitting device such as an AC corotron is used as the radiating source. A desired copying quality from an electrostatic copier machine requires keeping the radiating energy at a relatively constant value. Corona emitting devices however may have resistance which varies with ambient conditions. Furthermore, the problem is more aggravated by the leakage capacity current flow which may be many times higher than the true load demand of the corotron. Thus, the oscillator circuit of the invention could be used to provide constant current to the corona emitting device.

What is claimed is:

1. In a circuit for providing constant current to a varying load including a tuned oscillator network comprised of a transformer having a primary winding, a secondary winding and a feedback winding, a capacitor connected across said primary winding, first and second switching means coupled to said primary winding and said feedback winding, and a source of direct current coupled to said primary winding and to said first and second means, characterized in that a sense resistor is coupled to said secondary winding and said load and a feedback network is coupled to said sense resistor and said feedback winding, said feedback network including third and fourth switching means, electronic buffer means connecting the voltage across said sense resistor to input terminals of said third and fourth switching means whereby only one or the other of said third and fourth switching means conducts during consecutive half cycles of the AC voltage across said primary winding, a voltage averaging circuit connected to the output terminals of said third and fourth switching means for developing a voltage proportional to the load current output of said transformer, and an error amplifier coupled to said averaging circuit and said feedback winding to provide to said feedback winding a control voltage responsive to changes in the voltage developed by said averaging circuit whereby variations in said control voltage cause changes in the current conduction of said first and second switching means to compensate for variations in core loss of said transformer and variations in said load such that current flow through said load is substantially constant.

2. The circuit of claim 1 in which said feedback winding has a center tap and said control voltage is supplied to said center tap of said feedback winding.

3. The circuit of claim 1 in which the windings of said transformer are of such polarity that said feedback winding provides a positive feedback to said first and second switching devices.

4. The circuit of claim 2 in which said buffer means are voltage follower and voltage inverters including operational amplifiers and resistors, said averaging circuit includes an integrating capacitor and a resistor, and said error amplifier is an operational amplifier with its inverting input connected to said averaging circuit, its non-inverting input connected to an adjustable reference input voltage and its output terminal coupled to said center tap of said feedback winding.

* * * * *